No. 823,672. PATENTED JUNE 19, 1906.
C. DOBBS & J. R. PITMAN.
MACHINE FOR MAKING GRAINS OR FLAKES OF POWDER.
APPLICATION FILED JUNE 29, 1905.

5 SHEETS—SHEET 1.

Witnesses:
Inventors:

No. 823,672. PATENTED JUNE 19, 1906.
C. DOBBS & J. R. PITMAN.
MACHINE FOR MAKING GRAINS OR FLAKES OF POWDER.
APPLICATION FILED JUNE 29, 1905.

5 SHEETS—SHEET 4.

Witnesses:
Henry Drury
M. M. Hamilton

Inventors:
Charles Dobbs and
John R. Pitman
Harding & Harding
attys

No. 823,672. PATENTED JUNE 19, 1906.
C. DOBBS & J. R. PITMAN.
MACHINE FOR MAKING GRAINS OR FLAKES OF POWDER.
APPLICATION FILED JUNE 29, 1905.

5 SHEETS—SHEET 5.

Witnesses:
Harry Drury
M. M. Hamilton

Inventors:
Charles Dobbs &
John R. Pitman

UNITED STATES PATENT OFFICE.

CHARLES DOBBS AND JOHN R. PITMAN, OF HASKELL, NEW JERSEY, ASSIGNORS TO THE E. I. DU PONT DE NEMOURS POWDER COMPANY, OF WILMINGTON, DELAWARE, A CORPORATION OF NEW JERSEY.

MACHINE FOR MAKING GRAINS OR FLAKES OF POWDER.

No. 823,672.      Specification of Letters Patent.      Patented June 19, 1906.

Application filed June 29, 1905. Serial No. 267,511.

*To all whom it may concern:*

Be it known that we, CHARLES DOBBS and JOHN R. PITMAN, citizens of the United States, residing at Haskell, county of Passaic, and State of New Jersey, have invented a new and useful Improvement in Machines for Making Grains or Flakes of Powder, of which the following is a full, clear, and exact description, reference being had to the accompanying drawings, which form a part of this specification.

Our invention has for its object the production of a machine whereby grains or flakes of powder, preferably in polygonal form, may readily, rapidly, and properly be made without loss of material.

We first describe the embodiment of our invention illustrated in the accompanying drawings and then point out the invention in the claims.

Figure 1:
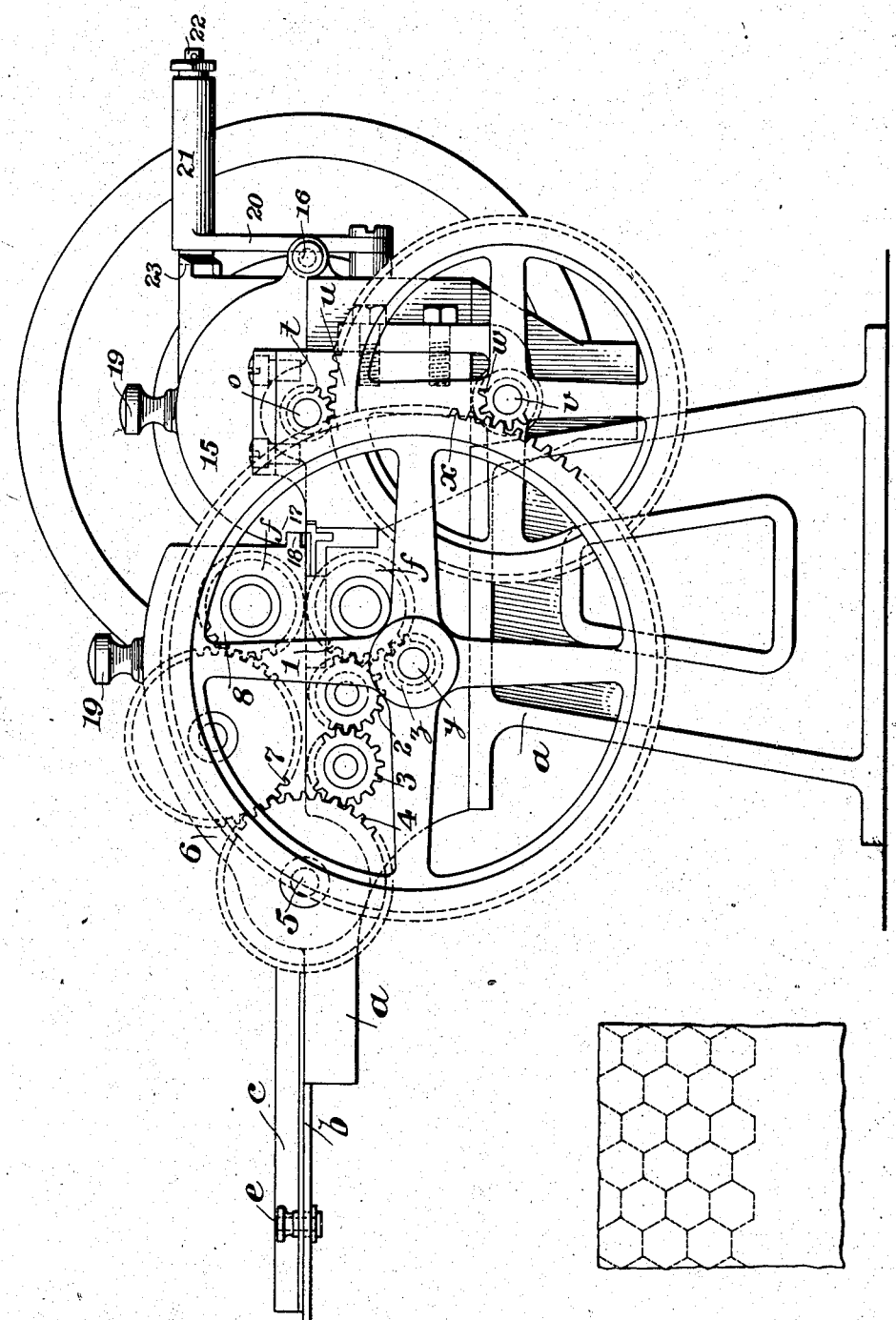
Figure 2:
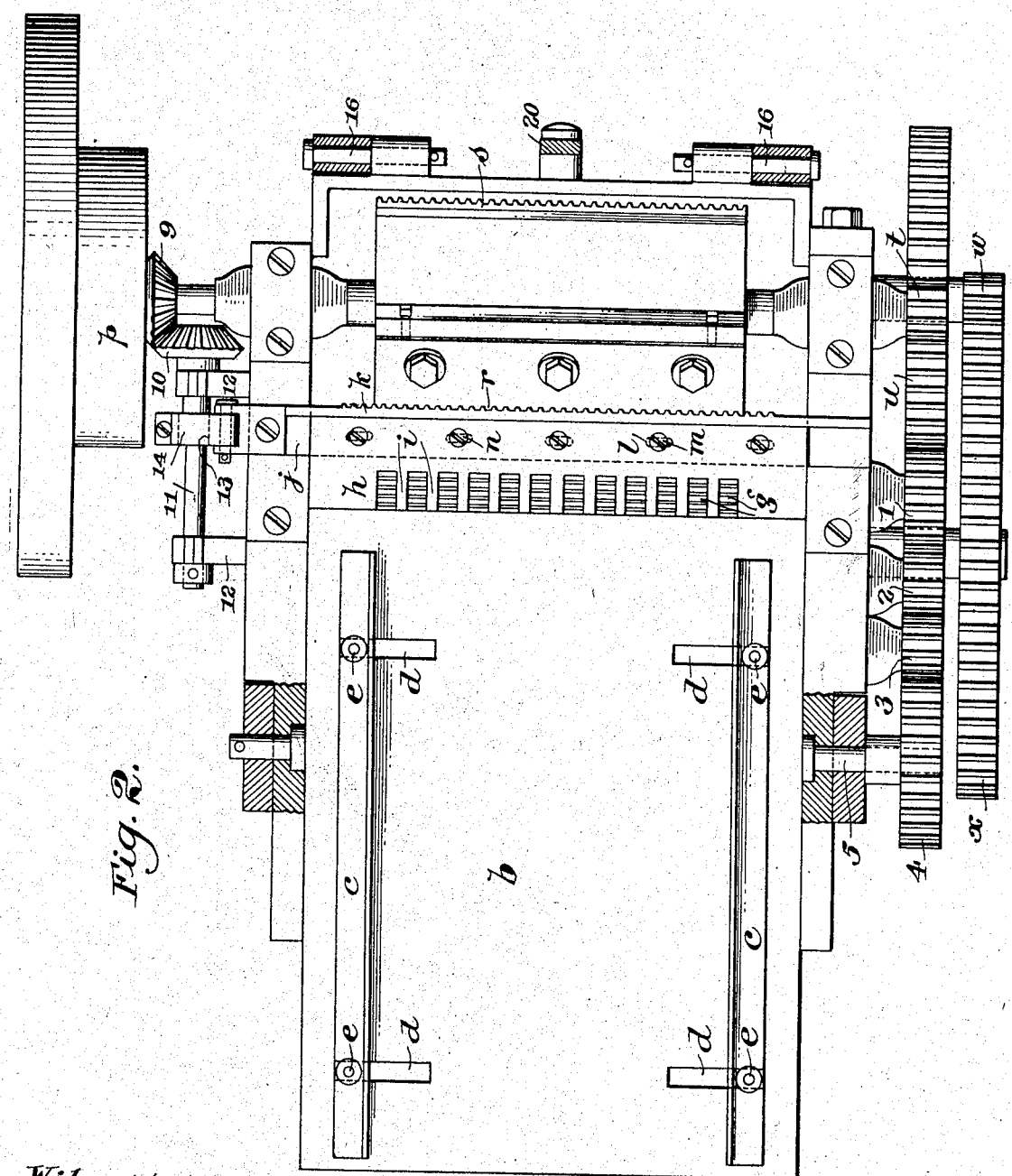
Figure 3:
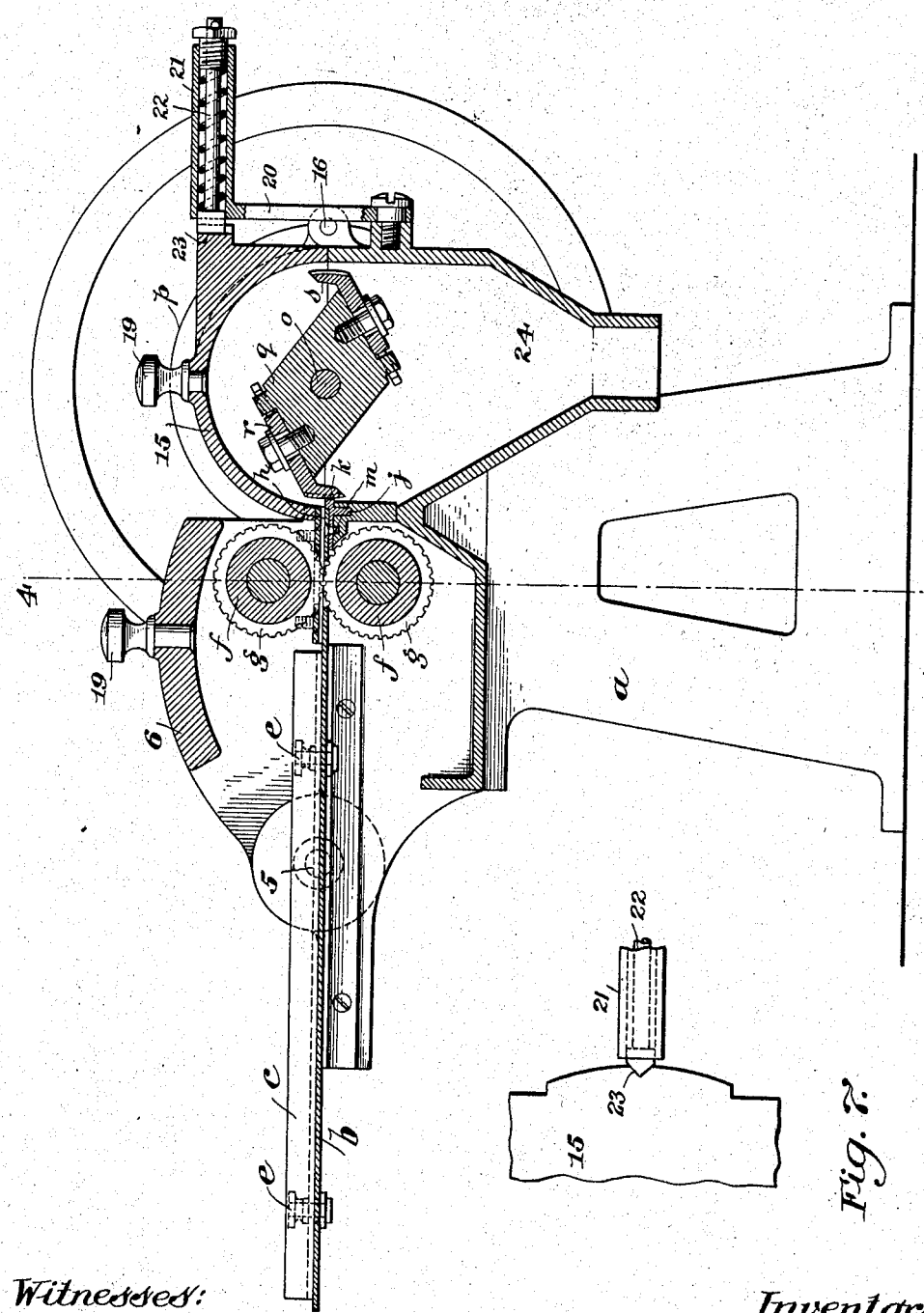
Figure 4:
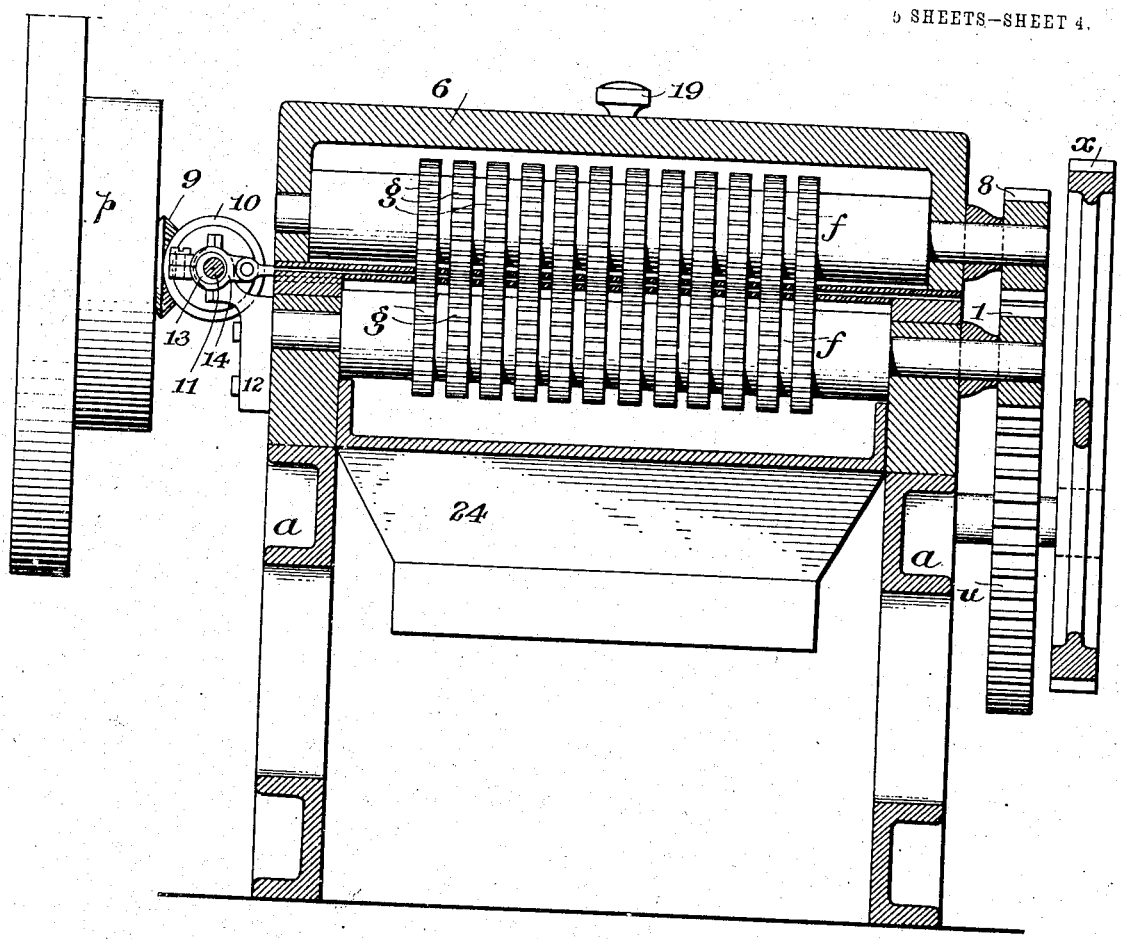
Figures 8, 9:
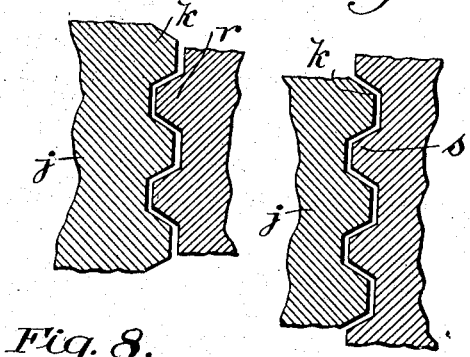
Figure 10:
Figure 5:
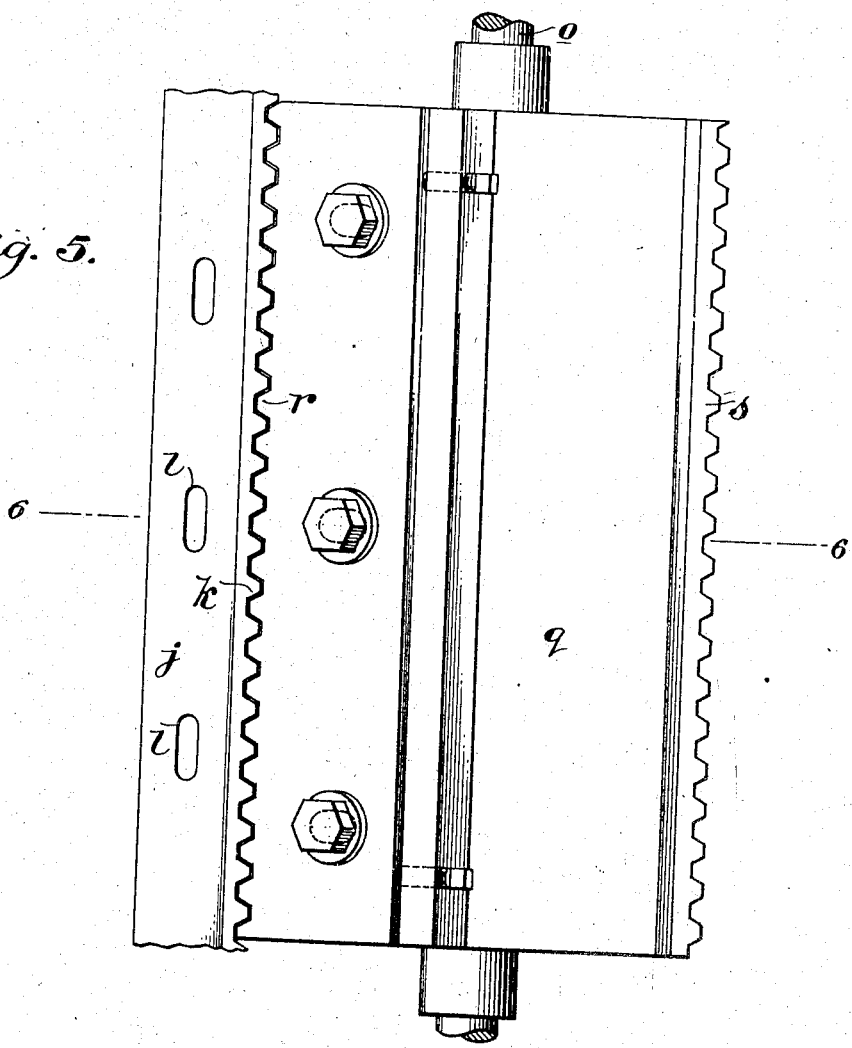
Figure 6:
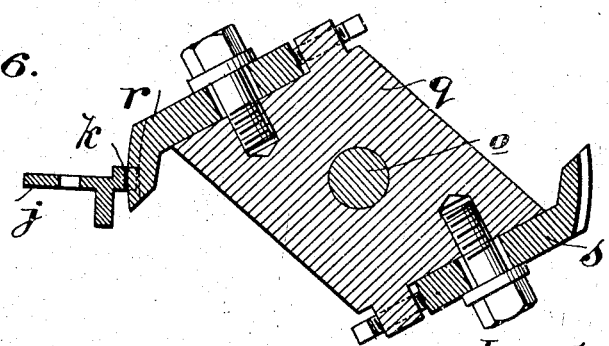

In the drawings, Figure 1 is a side elevation of the machine. Fig. 2 is a plan view with portions of the top removed. Fig. 3 is a central longitudinal sectional view. Fig. 4 is a transverse sectional view on the line 4 4, Fig. 3. Fig. 5 is an enlarged plan view of the cutters. Fig. 6 is a cross-sectional view on the line 6 6, Fig. 5. Fig. 7 is a plan view of a detail of the cover-locking arrangement. Fig. 8 is a sectional view showing several of the cutting edges or teeth. Fig. 9 is a similar view showing a shifted position of these cutters or teeth. Fig. 10 is an elevation of a flake or grain of powder enlarged about five diameters. Fig. 11 is an elevation of a powder sheet, showing the manner of making the cuttings for this particular shape flake or grain of powder.

$a$ is the frame of the machine; $b$, the feeding-table having the guides $c$, each of which is adjustably secured in slots $d$ by means of the screws $e$.

$f f$ are a pair of feeding-rolls mounted in the frame $a$. These rolls have the collars $g$. On the bed of the machine is the plate $h$, having the projections $i$, which enter the spaces between the collars $g$ of the rolls. Beneath this plate $h$ is the plate $j$, having the cutting edges $k$. This plate has the elongated slots $l$, through each of which passes a bolt $m$, secured to the machine. These bolts also pass through orifices in the plate $h$ and have the heads $n$.

$o$ is the main shaft, driven by the pulley $p$. Upon the shaft $p$ is the cutter-plate $q$, having the cutters $r$ and $s$ secured thereto. The cutters $r$ and $s$ are on opposite sides of the plates one hundred and eighty degrees apart and have their teeth or cutting edges staggered with reference to each other. Upon the outer end of the shaft $o$ is the gear $t$, meshing with the gear $u$ on the shaft $v$. On this shaft $v$ is the gear $w$, which meshes with the gear $x$ on shaft $y$. On the shaft $y$ is the gear $z$, which meshes with the gear 1 on the shaft of the lower roll $f$. This gear 1 meshes with the gear 2, which in turn meshes with the gear 3. The gear 3 meshes with the gear 4, the bearing for which is on the axis of the hinge 5 of the cover 6, which when closed extends over the rolls $f f$. This gear 4 meshes with the gear 7, which has its bearing on the cover 6. The last-mentioned gear 7 meshes with the gear 8 on the shaft of the upper roll $f$. Upon the shaft $o$ is the bevel-gear 9, which meshes with the bevel-gear 10, of the same size as gear 9 on the shaft 11, supported in bearings 12 from the machine. Upon this shaft 11 is the eccentric 13, connected by the eccentric-strap 14 with the plate $j$. The eccentric is so set that the plate $j$ is at rest when the cutters $r$ and $s$ are coacting with the non-rotating cutter $k$ and between these periods moves longitudinally of the rolls first in one direction and then in the other.

15 is the cutter-cover, hinged at 16 and having a cut-away portion forming a projection 17. Upon the cover 6 is a projection 18. The covers 6 and 15 are each provided with a handle 19. Upon the end of the machine is the upright 20, carrying the barrel 21, containing the spring-pin 22, which when the cover 15 is closed is in line with an orifice or detent 23 therein. In practice the cover 6 is first closed down and then the cover 15, the projection 17 on cover 15 then overlying the projection 18 on cover 6. The spring-pin 22 is then allowed to enter the detent 23.

Beneath the cutters is the hopper 24, through which the flakes or grains pass to a receptacle.

The operation of the machine is as follows: The sheet of powder is placed upon the table between the guides and started between the rolls, which feed it forward. The cutting edges $k$ and $r$ first coact (see Fig. 8) to cut one-half of the polygonal grain or flake, the cutting edges in the form shown being semi-hexagonal, although we do not intend to limit ourselves to this particular form of polygon. After this cutting the plate $j$ reciprocates, bringing into action the portion shown in Fig. 9, so that when it coacts with the cutters $s$ a reverse semihexagonal cut is made, (see Fig. 9,) the movement of the rollers being timed in the half-revolution of shaft $o$ to move the powder strip the distance or width of one-half of the hexagon.

In Fig. 11 is shown diagrammatically the way a sheet or strip of powder is cut up into grains or flakes. By this construction, as may be seen, there is no wastage of powder, all of the strip being cut into flakes or grains.

While we have shown two cutting edges $r$ and $s$, we do not intend to limit ourselves to that number, as it is evident that a greater number may be used. If four be used, it is only necessary to gear the connection of eccentric-shaft to the shaft $o$ two to one, so that the plate $j$ will reciprocate twice in one revolution of the shaft, set the cutting edges $r$ and $s$ at quadrant (ninety degrees) apart, and cause the rolls $f$ $f$ to travel twice as fast.

Having now fully described our invention, what we claim, and desire to protect by Letters Patent, is—

1. In a machine for forming powder grains or flakes, the combination, with feed-rolls of a plurality of rotating cutters, the cutting edges of pairs of cutters being staggered, with respect to each other, a non-rotatable cutter coacting therewith and means to reciprocate said non-rotatable cutter.

2. In a machine for forming powder grains or flakes, the combination, with feed-rolls of a plurality of rotating cutters, the cutting edges of pairs of cutters being staggered, with respect to each other, a non-rotatable cutter coacting therewith and means to give a relative movement longitudinally of the rolls between the rotating and non-rotating cutters.

3. In a machine for forming powder grains or flakes, the combination, with feed-rolls of a plurality of rotating cutters, the cutting edges of each cutter being in the form of a semipolygon and the cutting edges of pairs of cutters being staggered, with respect to each other, a non-rotatable cutter, the cutting edges being in the form of a semipolygon and means to reciprocate said non-rotatable cutter.

4. In a machine for forming powder grains or flakes, the combination, with feed-rolls of a plurality of rotating cutters, the cutting edges of each cutter being in the form of a semipolygon and the cutting edges of pairs of cutters being staggered, with respect to each other, a non-rotatable cutter, the cutting edges being in the form of a semipolygon and means to give a relative movement longitudinally of the rolls between the rotating and non-rotating cutters.

5. In a machine for forming powder grains or flakes, the combination, with feed-rolls of a plurality of rotating cutters, the cutting edges of pairs of cutters being staggered with respect to each other, a non-rotatable cutter coacting therewith and means to move the non-rotatable cutter with respect to the rotating cutters.

6. In a machine for forming powder grains or flakes, the combination, with feed-rolls of a plurality of rotating cutters, the cutting edges of pairs of cutters being staggered with respect to each other, a non-rotatable cutter coacting therewith and means to move the non-rotating cutter longitudinally of the rolls.

7. In a machine for forming powder grains or flakes, the combination, with feed-rolls of a plurality of rotating cutters, the cutting edges of each cutter being in the form of a semipolygon and the cutting edges of pairs of cutters being staggered, with respect to each other, a non-rotatable cutter, the cutting edges being in the form of a semipolygon and means to move the non-rotating cutter with respect to the rotating cutters.

8. In a machine for forming powder grains or flakes, the combination, with feed-rolls of a plurality of rotating cutters, the cutting edges of each cutter being in the form of a semipolygon and the cutting edges of pairs of cutters being staggered, with respect to each other, a non-rotatable cutter, the cutting edges being in the form of a semipolygon and means to move the non-rotating cutter longitudinally of the rolls.

9. In a machine for forming powder grains or flakes the combination, with feed-rolls of a plurality of rotating cutters, the cutting edges of pairs of cutters being staggered with respect to each other, a non-rotatable cutter coacting therewith and means to move the non-rotatable cutter with respect to the rotating cutters, between the passage of successive rotating cutters.

10. In a machine for forming powder grains or flakes, the combination, with feed-rolls of a plurality of rotating cutters, the cutting edges of pairs of cutters being staggered with respect to each other, a non-rotatable cutter coacting therewith, and means to move the non-rotating cutter longitudinally of the rolls between the passage of successive rotating cutters.

11. In a machine for forming powder grains or flakes, the combination, with feed-rolls of a plurality of rotating cutters, the cutting edges of each cutter being in the form of a semipolygon and the cutting edges of pairs of cutters being staggered, with respect to each other, a non-rotatable cutter, the cutting edges being in the form of a semipolygon and means to move the non-rotating cutter with respect to the rotating cutters between the passage of successive rotating cutters.

12. In a machine for forming powder grains or flakes, the combination, with feed-rolls of a plurality of rotating cutters, the cutting edges of each cutter being in the form of a semipolygon and the cuttting edges of pairs of cutters being staggered, with respect to each other, a non-rotatable cutter, the cutting edges being in the form of a semipolygon and means to move the non-rotating cutters longitudinally of the rolls, between the passage of successive rotating cutters.

13. In a machine for forming powder grains or flakes, in combination, a plurality of cutters in pairs, the cutting edges of such pairs being staggered with reference to each other and means to rotate said cutters.

14. In a machine for forming powder grains or flakes, in combination, a plurality of cutters in pairs, the cutting edges of such pairs being in the form of a semipolygon and staggered with reference to each other.

15. In a machine for forming powder grains or flakes, in combination, a plurality of cutters in pairs, the cutting edges of such pairs being staggered with reference to each other, means to rotate said cutters, and a non-rotatable cutter coacting therewith and means to produce a relative movement between the rotating and non-rotating cutters.

16. In a machine for forming powder grains or flakes in combination, a plurality of cutters in pairs, the cutting edges of such pairs being in the form of a semipolygon and staggered with reference to each other, and a non-rotatable cutter coacting therewith and means to produce a relative movement between the rotating and the non-rotating cutters.

17. In a machine for forming powder grains or flakes, in combination a plurality of cutters in pairs, the cutting edges of such pairs being staggered with reference to each other, means to rotate said cutters, and a non-rotatable cutter coacting therewith and means to produce a relative movement between the rotating cutters and non-rotating cutters, between the passage of successive rotating cutters.

18. In a machine for forming powder grains or flakes, in combination, a plurality of cutters in pairs, the cutting edges of such pairs being in the form of a semipolygon and staggered with reference to each other, and a non-rotatable cutter coacting therewith and means to produce a relative movement between the rotating cutters and non-rotating cutter, between the passage of successive rotating cutters.

19. In a machine for forming powder grains or flakes, in combination, a pair of feed-rolls, a source of driving power and gear connection between said driving power and said rolls for driving the same, a hinged cover for said rolls, one of said gears being supported in the axis of said hinge.

20. In a machine for forming powder grains or flakes, in combination, with the feeding-rolls and revolving cutters, of a hinged cover for the rolls, and a hinged cover for the cutters, one cover being hinged so as to overlie the other and a locking device for the overlying cover.

In testimony of which invention we have hereunto set our hands, at Haskell, New Jersey, on this 26th day of June, 1905.

CHARLES DOBBS.
JOHN R. PITMAN.

Witnesses:
GEO. W. COLFAX,
J. W. ACKERMAN, Jr.